United States Patent

[11] 3,628,660

[72] Inventor Cornelis In 't Veld
 Vlaardingen, Netherlands
[21] Appl. No. 23,348
[22] Filed Mar. 27, 1970
[45] Patented Dec. 21, 1971
[73] Assignee Rotterdams Havenreinigingen Transport Bedrijf

[54] SEPARATOR FOR NONMISCIBLE LIQUIDS
 12 Claims, 1 Drawing Fig.
[52] U.S. Cl. .................................................. 210/104,
 210/108, 210/110, 210/125, 210/301, 210/540
[51] Int. Cl. ...................................................... B01d 35/14
[50] Field of Search ........................................... 210/23,
 104, 108, 110, 301, 302, 121, 123, 125, 127, 540

[56] References Cited
UNITED STATES PATENTS
2,307,154   1/1943   Osuna .......................... 210/540 X Primary Examiner—Frank A. Spear, Jr.
Attorney—Young & Thompson ABSTRACT: A separator for nonmiscible liquids such as oil and water comprises a bell immersed in water and into which the oil and water are introduced. The bell floats or not, depending on the quantity of oil it contains, and a control responsive to the upward pressure of the floating bell prevents excessive introduction of oil into the bell. Oil is withdrawn from adjacent the top of the bell and water is withdrawn through an oleophobic filter beneath the bell. The filter can be backwashed with water. An underpressure in the separator can be maintained either by gravity or by a downstream pump.

PATENTED DEC 21 1971
3,628,660
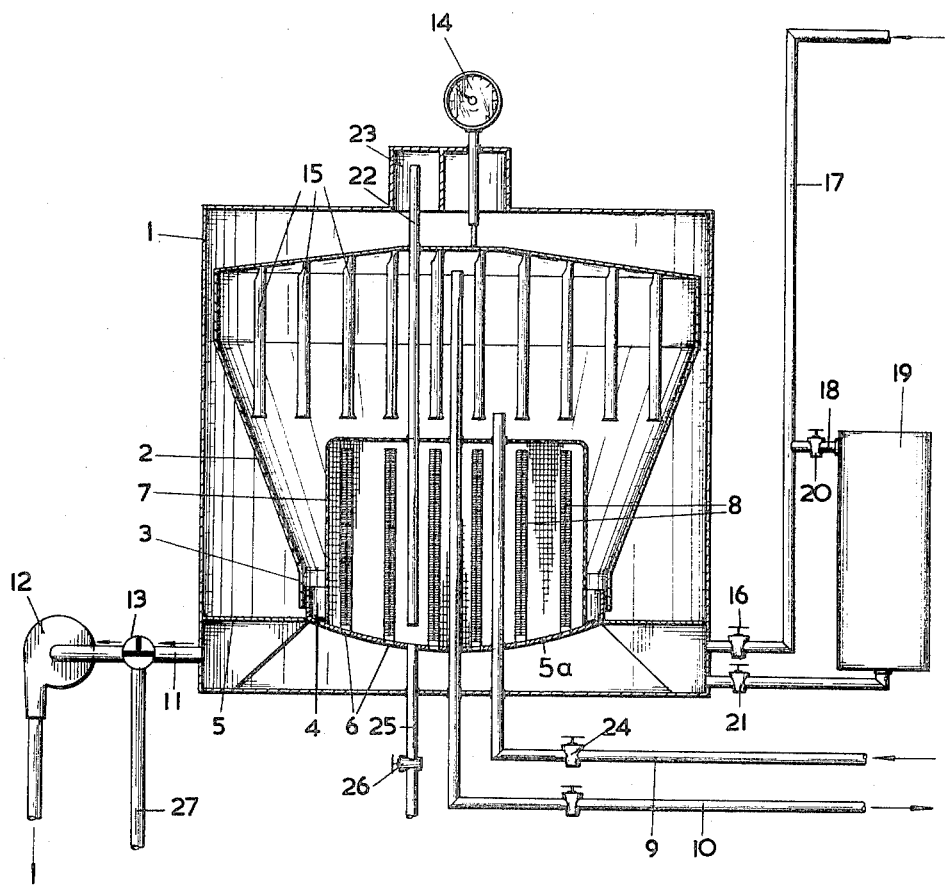
INVENTOR
CORNELIS IN 'T VELD
BY Young & Thompson
ATTORNEYS

SEPARATOR FOR NONMISCIBLE LIQUIDS

The invention relates to separators for liquids of different specific gravities and more particularly to systems in which a separation of nonmiscible liquids of different specific gravities is effected.

In known separators of this type a pump either mechanically or electrically operated is generally employed for pumping the liquids of different specific gravities into the separating apparatus and through the system. On the other hand it is well known that while normally certain liquids of different specific gravities such as water and oil or water and gasoline are not miscible, these liquids when agitated will form an emulsion or a mixture that is not readily separable. Consequently it will be apparent that the isolation of these liquids from each other must take place before passing through a pump or other suitable impelling means.

To this end the present invention has for its objects to provide a fluid separator for liquids of different specific gravities having a suction feed, in which in operation a depression is established in the separator to permit flow of liquids of different specific gravities from their source to the separator.

Another object of the present invention is to provide a fluid separator including a tank and a floating separation chamber in said tank in which the separation of liquids of different specific gravities is accomplished within said chamber.

Another object of the present invention is to improve the separation of liquids of different specific gravities.

Still another object of the present invention is to provide a separator for liquids of different specific gravities including an automatic control for preventing an overloading condition.

Another object of the present invention is to provide a separator for liquids of different specific gravities in which the cleaning of the interior of the separator can be accomplished without breaking off or opening the apparatus.

In accordance with the principles of the present invention the above objects are obtained by providing a separating apparatus for the automatic separation of liquids of different specific gravities, including a tank with an inlet pipe for the liquids of different specific gravities, a discharge pipe for the liquid of heavier specific gravity and a discharge pipe for the liquid of lighter specific gravity in which a bell or floating separation chamber is present in said tank. Said tank has been entirely filled up with the liquid of heavier specific gravity. Said chamber is a hollow body being merely open at the bottom side. The inlet pipe for the liquids of different specific gravities empties inside said chamber. The mouth of the discharge pipe for the liquid of lighter specific gravity also lies inside said chamber but at a greater distance from the chamber opening than the mouth of the inlet pipe for the liquids of different specific gravities. The pressure at the side of discharging of both separated liquids is lower than the pressure at the liquids of different specific gravities supply side not being provided with an intermediate pump.

In operation of this separating apparatus liquids of different specific gravities flow into the chamber and a gravitational separation takes place in which the liquid of lighter specific gravity settles in the upper part of the chamber where the mouth of the discharge pipe for the liquid of lighter specific gravity is present. The supply of liquids of different specific gravities causes the accumulation of liquid of lighter weight in the upper part of the chamber and the reduction of the weight of the content of the chamber. The chamber receives an upward thrust. The more liquid of lighter weight gathered in the chamber the more upward thrust is available. This energy, obtained in this way, can be used for a safe control of the discharge operation of the separated liquids. A pressure system is responsible for the discharging process which can involve an intermittent operation caused by chamber's signals. Even a continuous operation can be obtained when using an additional pressure system.

However, the separator according to the invention includes a pressure system by means of which said intermittent operation has been converted into a permanent operation.

It is pointed out that the separator of the invention operates with an underpressure or depression, that is to say the liquids of different specific gravities are sucked to the tank by the fact that after the separation the liquid of heavier weight and the liquid of lighter weight are sucked out of the tank. Said suction function can be obtained either by positioning the apparatus between the level of the source of liquids of different specific gravities and the level of the reservoirs of the separated liquids or by using a suction pump in the discharge pipe for the liquid of heavier weight.

It will be evident that in the apparatus according to the invention the chamber has a double function. Just as in the conventional separator, the chamber acts as a means for controlling the discharge or the delivery of liquid of lighter weight but in addition the chamber constitutes the receptacle or collecting dome in which the separation of both liquids takes place.

It is pointed out that in using the apparatus of the invention on board of a ship it is guaranteed that during operation liquid of lighter weight (for example, oil) can never by pumped overboard because the oil being accumulated in the chamber generates a signal for switching on the pressure system which derives the pressure from the water in which the ship floats. This implies that the oil which has been accumulated in the slop tank having an air breather extending up to the ship deck and which rises in said air breather can never come above outboard water level.

With these and other objects in view, the invention consists in the construction, arrangement and combination of parts, all of which will be first fully described and afterwards pointed out in the appended claims.

As appears from the accompanying drawings, the separator according to the invention comprises a tank 1 having in its interior a bell or floating separation chamber 2. Said chamber represents a hollow body in the shape of almost an inverted frustum of a cone having an opening at the bottom side. At said opening the float 2 is provided with a collar 3 telescoping about a tube 4 being supported by a horizontal supporting plate 5. The portion 5a of said supporting plate 5 within tube 4 is curved downwardly and provided with holes 6. A filter battery 7 including filter means 8 is supported by said portion 5a of supporting plate 5. An inlet pipe 9 for the liquids of different specific gravities enters said tank and empties in the interior of chamber 2 above filter battery 7. A discharge pipe 10 for the liquid of lighter weight extends through the tank wall and in the interior of chamber 2 ending near the top wall of float 2 at a higher point than the mouth of pipe 9. The liquid of heavier weight discharges through discharge pipe 11.

Before operation, tank 1 is filled up with liquid of heavier weight. A characteristic novel feature of the separator of the invention is that it operates with depression. Said depression may be accomplished by positioning tank 1 beneath or at the level of the source of the liquids of different specific gravities and higher than the reservoir (not shown) of the liquid of lighter weight and the reservoir (not shown) of the liquid of heavier weight. If a positioning of the tank above the reservoir of the liquid of heavier weight is not possible, discharge pipe for the liquid of heavier weight is provided with a suction pump 12. It is pointed out that the reservoir for the liquid of lighter weight is always positioned at a level beneath the supporting level of tank 1. The separator mechanism is adapted to effect automatically the separation of the liquids of different specific gravities.

By opening valve 13 in discharge pipe 11 causing the discharge of the liquid of heavier weight, a depression is created in tank 1 causing the flow of liquids of different specific gravities into chamber 2 through inlet pipe 9. The liquids of lighter specific gravities will accumulate in the upper part of chamber 2.

It will, of course, be apparent to those skilled in the art that in accumulating lighter liquid in the upper part of chamber 2 said chamber rises causing the rising of the level of lighter liquid up to above the mouth of discharge pipe 10 and the lighter liquid flows out of the separator through pipe 10. During said flowing out, chamber 2 sinks until the level of the lighter liquids falls below the mouth of pipe 10 and the flowing out of lighter liquids stops. Consequently, the separator has an intermittent flowing out of liquids of lighter specific gravity.

It is pointed out that as distinct from the present day separators, in the apparatus according to the invention the separation of liquids of different specific gravities is accomplished within the chamber and that suction, separation and flow of the liquids to be separated take place before passing through a pump or other suitable impelling means so that certain liquids of different specific gravities which are not miscible, for example water and oil, are not mixed or emulsified. In order to increase the effect of the chamber as a separation space as much as possible a plurality of open-ended pipes, so-called rising pipes 15, has been positioned in the interior of chamber 2. Particles of liquid of lighter weight being halfway up the chamber, having not enough rising capacity and suspending beneath the open end of a rising pipe, can unhampered rise and outside of any turbulence through said pipe, join the liquid of lighter weight in the upper part of chamber 2.

Although a suitable separation of the liquids of different specific gravities is obtained, the possibility remains that smaller particles of lighter liquid having insufficient rising capacity are carried with by the liquid of heavier weight flowing away through openings 6 and discharge pipe 11.

A filter battery prevents the discharge of said particles. In using the apparatus for the separation of oil from an oil-water mixture each filter is made of a substance which lets pass water but does not let pass oil. Preferably each filter consists of a pile fabric or a braided pile fabric of a polyamide, such as nylon, with the pile turned toward the interior of the chamber.

The filters have been enclosed by a housing 7 of gauze.

In order to reduce the frequency of rising-sinking movement of the chamber, the top wall of chamber 2 is in cooperation with a pressure system 14 at the upper side of tank 1, by means of which the rising of chamber 2 can be retarded.

Although such a pressure system leads to an improvement of operation of the apparatus, the invention provides a pressure system 14 being embodied so that it stops the movement of chamber 2 but measures the pressure exerted by said chamber on said system in operation. Said pressure is indicated and used for preventing overloading of the separator in the following manner:

When the quantity of the liquid of lighter weight accumulated in the upper part of chamber 2 is too great, for instance the separating surface between said liquid and the liquid of heavier weight lies in the neighborhood of the lower end of rising pipes 15, pressure system 14 closes valve 13 in discharge pipe 11 through any suitable transmission system and opens valve 16 in a pipe 17 for the supply of liquid of heavier weight through any suitable transmission system. In pipe 17 the pressure is higher than in tank 1. In doing so, the depression function of the separator is transformed into an overpressure function and the liquid of lighter weight is forced into discharge pipe 10.

From above paragraph, it will be evident that pressure system 14 responding to changing weight of chamber 2 controls the mechanism responsible for the control of the apparatus.

Further, the above-mentioned overpressure function has the advantage that filters 8 are cleaned since in this function the flow of liquid of heavier weight is opposite to the flow of said liquid in depression function of the apparatus.

As usual, the separator according to the invention has an alarm system. This system consists of a rising pipe 22 extending from the interior of filter battery 7 through the top wall of chamber 2 up to a recess 23 of tank 1 and a transmission system, not shown, which stops the operation of the separator when a predetermined quantity of liquid of lighter weight is sensed in said recess, by closing valve 24 in pipe 9. Said alarm system comes into operation when pressure system fails in controlling the mechanism responsible for the control of the apparatus.

In that case, the thickness of the layer of liquid of lighter weight can increase so that the liquid of heavier weight in the filter battery includes too many particles of liquid of lighter weight and there is danger of disruptive discharge of the filters. Particles of liquid of lighter weight then rise through rising pipe 22 and accumulate in recess 23. At a predetermined quantity of liquid of lighter weight in said recess, a transmission system, not shown, comes into operation and stops the operation of the separator by closing valve 24 in the supply pipe for the liquids of different specific gravities. The transmission system may have a form known per se.

It has already been pointed out that the portion of supporting plate 5 within tube 4 is downwardly curved. Sand and silt being carried along by the flow of liquids of different specific gravities will sink in chamber 2 and accumulate on said curved portion of supporting plate 5. Said portion is provided with a discharge pipe 25 extending through the bottom of tank 1. When the separator is out of operation said apparatus can be cleaned by opening valve 16 and valve 26 in pipe 25. It is pointed out that cleaning of the interior of the apparatus can take place without dismantling the apparatus.

Pipe 17 for the supply of liquid of heavier weight is bypassed by a pipe 18 including a tank 19 and two valves 20 and 21. Said tank 19 contains cleaning medium. If necessary, as when in spite of normal cleaning operation filters 8 are not cleaned, the apparatus can be further cleaned by closing valve 16 after opening valves 20 and 21.

As already remarked, when it is not possible to position tank 1 between the level of liquids of different specific gravities and the level of liquid of heavier weight so that in tank 1 a depression is generated, for instance on board a ship in which the separator is used to separate oil from the water-oil mixture from the bilges, the depression in tank 1 is augmented by using pump 12 in discharge pipe 11 of liquid of heavier weight. No particular demands are made upon said pump augmenting the automatic suction function of the separator. The difficulties inherent in handling liquids of different specific gravities are avoided so that said pump can be an uncomplicated one.

In practice, there is used a centrifugal pump. In order to maintain the function of said pump even in case of overloading of the apparatus, pipe 11 is provided with a branch pipe 27 to outboard and valve 13 is a three-way tap being embodied so that in stopping the discharge of water from tank 1 water is supplied to pump 12 through pipe 27.

If desired, a labyrinth packing in particular for the liquid of lighter weight may be used between collar 3 and tube 4.

It is pointed out that the control effect is inherent in the apparatus of the invention. After the oil layer in the chamber 2 has reached its maximum thickness and the pressure meter 14 has reached the predetermined upper limit value, valve 13 is thrown over to outboard, and water and oil is drained by opening valve 16 and the valve in pipe 10. The supply of water-oil mixture has been interrupted and consequently overloading of the apparatus has been prevented. Instead of water-oil mixture, water is supplied through pipe 17 causing in the filter area and in the liquid separation area of the chamber a water-flow reversal by which the float chamber and the filters are cleaned.

What is claimed is:

1. A separator for nonmiscible liquids of different specific gravities, comprising a tank, a downwardly open bell adapted to float in the tank, a feed conduit for unseparated liquids that has an outlet in the bell, a discharge conduit for discharging lighter liquid that separates in the bell, said discharge conduit having an intake in the bell at a higher level than the outlet of said feed conduit, and means for separately removing from the tank lighter and heavier liquids at pressures lower than the pressure in said feed conduit.

2. A separator as claimed in claim 1, said bell terminating downwardly in a collar that telescopes with a flange, 3. A separator as claimed in claim 2, and a valve-controlled conduit extending downwardly from said wall for discharging sediment that collects on said wall.

4. A separator as claimed in claim 2, said wall being downwardly inclined toward its center.

5. A separator as claimed in claim 4, and filter means supported above said multiperforate wall, said filter means selectively passing only said heavier liquid.

6. A separator as claimed in claim 1, and a plurality of vertical pipes open at both ends and mounted in the bell to promote separation of the liquids.

7. A separator as claimed in claim 1, and a discharge conduit for the heavier liquid from the bottom of the tank, and means to supply said heavier liquid under pressure to the bottom of the tank.

8. A separator as claimed in claim 1, and means responsive to upward movement of the bell to discontinue withdrawal of the heavier liquid from the tank and to introduce said heavier liquid into the bottom of the tank thereby to force said lighter liquid out of the separator.

9. A separator as claimed in claim 8, and a container for cleaning medium in parallel fluid circuit with said means for introducing said heavier liquid into the bottom of the tank, and means for selectively directing said heavier liquid through said container and into the bottom of said tank.

10. A separator as claimed in claim 1, and a rising pipe extending from adjacent the bottom of the bell up through the top of the bell for conveying to a location above the bell a portion of said lighter liquid when an excess of lighter liquid accumulates in the bell.

11. A separator as claimed in claim 1, and a pump downstream of the tank for discharging said heavier liquid from the bottom of the tank.

12. A separator as claimed in claim 11, and a bypass conduit for discharging said heavier liquid in bypass relationship to said pump.

* * * * *